United States Patent
Barthe et al.

(10) Patent No.: US 9,769,432 B2
(45) Date of Patent: Sep. 19, 2017

(54) CAMERA BASED APPARATUS FOR SAFEGUARDING A MACHINE

(71) Applicant: Pilz GmbH & Co. KG, Ostfildern (DE)

(72) Inventors: Guillaume Barthe, Ostfildern (DE); Steffen Kirn, Ostfildern (DE); Andreas Veit, Ostfildern (DE)

(73) Assignee: PILZ GMBH & CO. KG, Ostfildern (DE)

( * ) Notice: Subject to any disclaimer, the term of this patent is extended or adjusted under 35 U.S.C. 154(b) by 0 days.

(21) Appl. No.: 14/862,285

(22) Filed: Sep. 23, 2015

(65) Prior Publication Data

US 2016/0094813 A1     Mar. 31, 2016

(30) Foreign Application Priority Data

Sep. 29, 2014     (DE) .................. 10 2014 114 066

(51) Int. Cl.
| | | |
|---|---|---|
| *H04N 7/18* | (2006.01) | |
| *H04N 5/225* | (2006.01) | |
| *F16P 3/14* | (2006.01) | |

(52) U.S. Cl.
CPC .............. *H04N 7/183* (2013.01); *F16P 3/142* (2013.01); *F16P 3/144* (2013.01); *H04N 5/2252* (2013.01);
(Continued)

(58) Field of Classification Search
CPC .... H04N 7/183; H04N 5/2252; H04N 5/2253; H04N 5/2254; F16P 3/142; F16P 3/144
(Continued)

(56) References Cited

U.S. PATENT DOCUMENTS

| 4,987,436 A | 1/1991 | Misawa |
| 8,063,353 B2 * | 11/2011 | Veit ...................... H04N 5/2253 348/374 |

(Continued)

FOREIGN PATENT DOCUMENTS

| DE | G 87 18 120.7 | 5/1995 |
| DE | 10 2006 050 235 A1 | 4/2008 |

(Continued)

OTHER PUBLICATIONS

European Search Report for EP 15 18 6511; dated Jan. 27, 2016; 7 pp.

(Continued)

*Primary Examiner* — Nhan T Tran
(74) *Attorney, Agent, or Firm* — Harness, Dickey & Pierce, P.L.C.

(57) ABSTRACT

An apparatus for safeguarding a machine having a machine part performing a working movement, has a light source, a camera unit and a control unit. The light source and camera unit are attached to the machine part so as to concurrently move together with the machine part. The camera unit has an objective body with an optical lens element, an electronic image sensor arranged on a component support, an aperture stop, and a coupling part having a one-piece body by means of which the objective body and the component support are joined in a defined relative position to one another. The one-piece body fixedly rests on the component support thereby holding the aperture stop at a defined position relative to the electronic image sensor without individual adjustment. The control unit is designed to stop the working movement of the machine part depending on a signal produced by the camera unit.

11 Claims, 5 Drawing Sheets

(52) U.S. Cl.
CPC ......... *H04N 5/2253* (2013.01); *H04N 5/2254* (2013.01)

(58) Field of Classification Search
USPC ........................................ 348/373, 374, 335
See application file for complete search history.

(56) References Cited

U.S. PATENT DOCUMENTS

| | | | | |
|---|---|---|---|---|
| 2004/0012698 | A1* | 1/2004 | Suda .................... | H04N 5/2254 348/315 |
| 2005/0248684 | A1* | 11/2005 | Machida .............. | H04N 5/2257 348/373 |
| 2008/0303939 | A1 | 12/2008 | Hsu et al. | |
| 2009/0141161 | A1 | 6/2009 | Kawamoto | |
| 2009/0309969 | A1* | 12/2009 | Wendler ................ | F16P 3/144 348/143 |
| 2010/0005982 | A1* | 1/2010 | Veit ...................... | H04N 5/2253 396/529 |

FOREIGN PATENT DOCUMENTS

| | | |
|---|---|---|
| DE | 10 2007 004 724 A1 | 7/2008 |
| EP | 0 597 934 A1 | 3/1997 |

OTHER PUBLICATIONS

EN ISO 13849-1; Safety of machinery—Safety-related parts of control systems—Part 1: General principles for design; Nov. 2006; 97 pp.
CEI IEC 61508-2; Functional safety of electrical/electronic/programmable electronic safety-related systems; May 2000; 152 pp.
Ronald A. Petrozzo et al.; Telecentric lenses simplify non contact metrology; Oct. 15, 2001; 4 pp.
http://www.opto-engineering.com/resources/telecentric-lenses-tutorial; OPTO Engineering; Telecentric lenses tutorial; undated; 9 pp.
German language Examination Report for Appl'n No. 15 186 511.0; Feb. 24, 2017; 5 pp.

\* cited by examiner

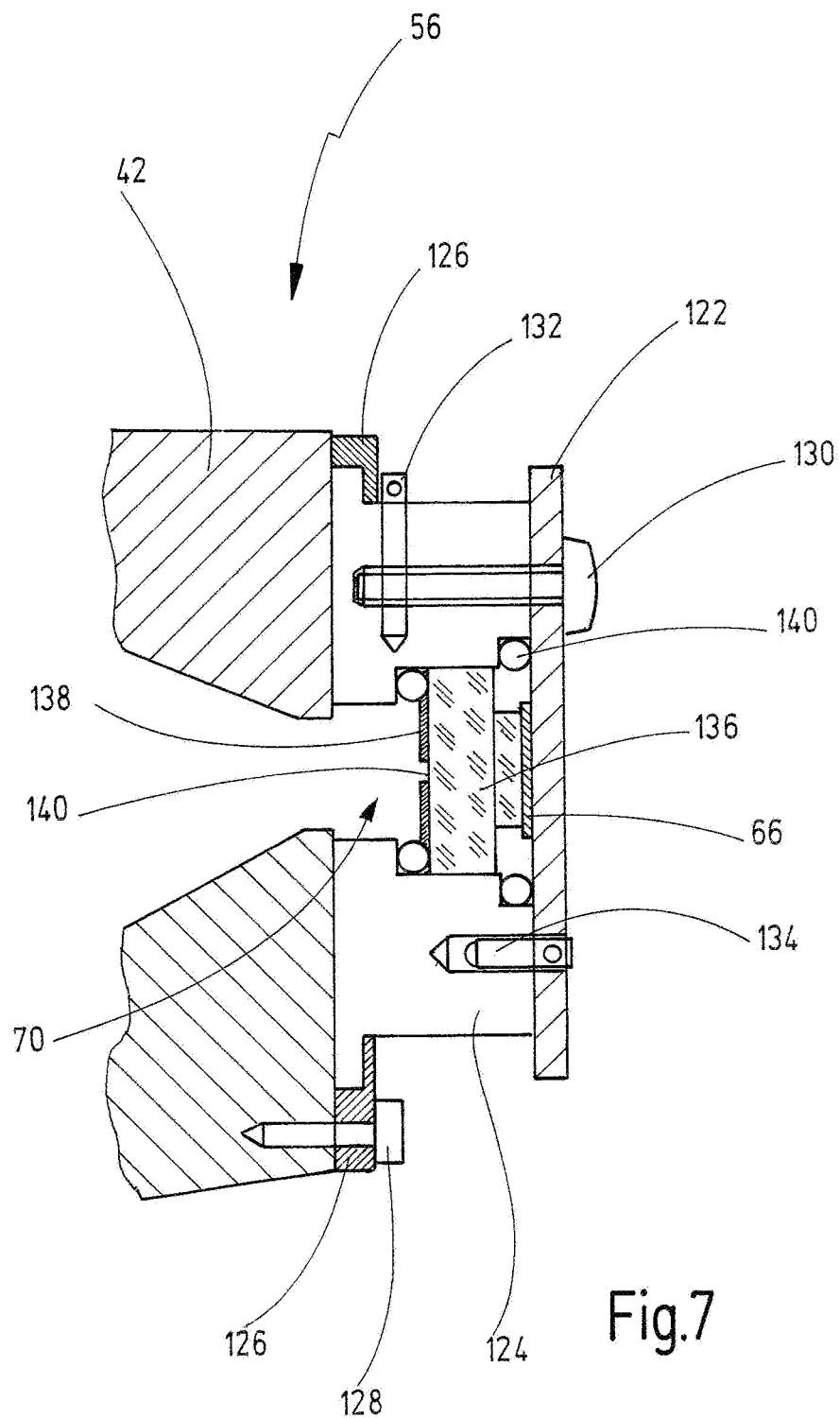

CAMERA BASED APPARATUS FOR SAFEGUARDING A MACHINE

CROSS-REFERENCE TO RELATED APPLICATION

This application claims priority from German patent application DE 10 2014 114 066.4 filed on Sep. 29, 2014. The entire content of the priority application is incorporated herein by reference.

BACKGROUND OF THE INVENTION

The present invention relates to a camera based apparatus for safeguarding a machine and to a camera unit that can advantageously be used in such an apparatus. In particular, the invention relates to a camera unit and apparatus for safeguarding a machine having a first machine part performing a working movement relative to a second machine part, such as a press brake or similar bending, cutting or stamping machine.

DE 10 2007 004 724 A1 describes a prior art apparatus. The apparatus comprises a light source and a camera unit that are designed to be disposed on the right and left of a punch of a bending press, so that so that they are concurrently moved during the working movement of the punch. The concurrently moving light source produces a light beam running parallel to the leading edge of the punch and directed to the likewise concurrently moving camera unit on the opposite end. The camera unit receives the light beam and in this way can directly monitor the spatial region in front of the leading edge of the pressing tool. An intrusion into the monitored spatial region during the working movement is detected and typically results in stopping the working movement, in particular by switching off power to the bending press.

The mechanical design of a suitable camera unit is also described in DE 10 2007 004 724 A1. The camera unit includes an objective with an objective body and an electronic image sensor arranged on a component support. The objective body and the component support are connected by means of a coupling mechanism to form an integrated assembly. The coupling mechanism has two defined movement capabilities that enable a coupling part to be displaced relative to the objective body on the one hand and relative to the component support on the other hand. By means of two releasable clamping mechanisms, the two movement capabilities can be enabled or blocked independently of each other. This enables very accurate adjustment of the image sensor relative to the objective in various directions.

The good adjustment capability of the image sensor is however accompanied by a complex design. In particular, a complex multi-part design of the coupling mechanism is necessary for the provision of the two independent movement capabilities. Wear of said parts can result in the clamping mechanisms loosening under high loading, or as a result of strong shocks or vibrations. The result of this is that detection errors can occur and readjustment is necessary at regular intervals. In addition, the complex design places high requirements on manufacturing, whereby in turn the manufacturing costs of such a camera unit increase. It is thus desirable to provide a simpler camera unit for an apparatus of the afore-mentioned type.

SUMMARY OF THE INVENTION

Against this background, it is an object of the present invention to provide a camera unit for an apparatus of the afore-mentioned type, which camera unit can be assembled rapidly and simply with reduced or even without individual adjustment of the optical components.

It is another object to provide an apparatus for safeguarding a machine using such an improved and simplified camera unit.

It is yet another object to provide a camera unit that is favorable for manufacturing and provides a robust but high precision design of the optical system.

According to one aspect of the invention, there is provided an apparatus for safeguarding a machine having a first machine part and a second machine part, wherein the first machine part performs a working movement relative to the second machine part in order to process a workpiece, the apparatus comprising a light source, a camera unit, and a control unit, wherein the camera unit is configured to be attached to the first machine part in such a manner that it concurrently moves together with the first machine part during the working movement and views into a spatial region in front of the first machine part, wherein the light source is configured to be arranged opposite the camera unit so that it illuminates the camera unit along the spatial region during the working movement, wherein the control unit is designed to stop the working movement of the first machine part depending on a signal produced by the camera unit, and wherein the camera unit comprises an objective body in which at least one optical lens element is secured, an electronic image sensor arranged on a component support, a coupling part having a one-piece body by means of which the objective body and the component support are joined in a defined relative position to one another, thereby forming an integrated camera assembly, and an aperture stop, wherein the component support has a surface on which the electronic image sensor is arranged, and wherein the one-piece body fixedly rests on the surface thereby holding the aperture stop at a defined position relative to the electronic image sensor without individual adjustment.

According to another aspect of the invention, there is provided a camera unit for an apparatus for safeguarding or controlling a machine, comprising an objective body in which at least one optical lens element is secured, an electronic image sensor arranged on a component support, a coupling part having a one-piece body by means of which the objective body and the component support are joined in a defined relative position to one another, thereby forming an integrated assembly, and an aperture stop, wherein the component support has a surface on which the electronic image sensor is arranged, and wherein the one-piece body fixedly rests on the component support thereby holding the aperture stop at a defined position relative to the electronic image sensor without individual adjustment.

With the new camera unit, the aperture stop is fixedly integrated, i.e. without any defined movement capabilities for an individual adjustment, within the coupling part or at least precisely positioned by virtue of the coupling part that couples the objective to the image sensor. The coupling part may include the aperture stop in a one-piece design and may be fixedly connected to the component support. As the aperture stop is fixed by the coupling part, a separate adjustment of the image sensor relative to the aperture stop may be dispensed with. In other words, the position of the aperture stop relative to the image sensor and relative to the at least one lens element may advantageously be dependent only on the manufacturing tolerances of the coupling part and of the component support. High precision of the optical system can thus be achieved in a cost-efficient manner.

The new camera unit may essentially be assembled from only three components that are combined without additional adjustment, namely the objective body, the coupling part including the aperture stop and the component support including the image sensor. In addition, fixing of these three components in a defined relative position to one another is possible with simple means, for example with a screw connection or a plug connection, whereby the design is further simplified. The small number of components and the simple design enable inexpensive assembly and low manufacturing costs.

Moreover, the new camera unit is particularly robust against strong shaking and vibrations, because by design no movement capabilities are allowed between the individual parts. Advantageously, the design is low wear and requires no readjustment. The aforementioned object is therefore completely achieved.

In a preferred refinement, the one-piece body comprises a depression, on the bottom of which the aperture stop is located, preferably centrally.

In this refinement, the aperture stop can be particularly well integrated within the coupling part and fixed at a defined distance from the image sensor. As a result of the positioning in a depression, the aperture stop is disposed within the interior of the coupling part protected by the side walls of the depression. The central arrangement in a preferably circular depression enables particularly simple positioning of the aperture stop in relation to the image sensor.

In a further refinement, the component support comprises a ceramic substrate forming a smooth surface on which the image sensor is arranged.

This refinement is advantageous in two ways. On the one hand a ceramic substrate is particularly stable and insensitive to temperature fluctuations, so that the body of the coupling part can be oriented very precisely to the ceramic substrate. On the other hand, a ceramic substrate is a very good insulator, whereby the image sensor can be disposed so as to be electrically insulated from the aperture stop and the coupling part. Particularly advantageously, the distance between the image sensor and the coupling part is selected so that a voltage breakdown as a result of a static charge on the housing, which is connected to the objective body and the coupling part, can be excluded.

In a further refinement, the one-piece body comprises at least a first and a second locating pin and the surface of the component support comprises a first opening and a second opening, wherein the first locating pin engages in the first opening and the second locating pin engages in the second opening.

This refinement enables simple and inexpensive assembly in combination with high positioning accuracy of the image sensor relative to the objective. Moreover, the refinement gives a very robust and vibration-proof design.

In a further refinement, the image sensor is arranged directly on the component support without a sensor housing. The image sensor is preferably a semiconductor chip that is glued directly onto the component support.

This refinement enables particularly high accuracy during orientation of the image sensor relative to the objective, since assembly tolerances are eliminated that inevitably result if a semiconductor chip is mounted in a dedicated chip housing, such as a PGA or SPGA housing.

In a further refinement, the camera unit further comprises a seal that together with the coupling part and the component support encloses the image sensor in a dust tight manner.

In this refinement, the image sensor can be particularly well protected against fouling and mechanical damage, whereby additional protection is enabled inexpensively. The risk of an erroneous detection by the image sensor because of fouling can thus be reduced or completely excluded.

In a further refinement the camera comprises a glass element that is disposed in a clear space between the coupling part and the image sensor.

The refinement enables a particularly robust design, in which a glass element is disposed in front of the image sensor. The glass element constitutes a medium with defined optical properties for the optical system and thus ensures a particularly good imaging characteristic.

In a further refinement, the glass element comprises a further diaphragm that is disposed coaxially with the aperture of the coupling part.

In this refinement the further diaphragm forms the optically effective aperture stop, whereas the opening on the coupling part has no optical function. The aperture on the coupling part is preferably a cut-out whose clear diameter is of such a size that the opening exerts no influence on the optical system. The refinement enables particularly precise manufacture of an aperture stop, in particular a pinhole. Preferably the glass element is covered by a coating in which a pinhole is incorporated by means of a laser. A coupling part with a fixedly connected aperture stop can thus be implemented particularly easily.

In a further refinement, the glass element is fixedly connected to the coupling part and preferably rest with its entire surface on the image sensor.

In this refinement, the glass element lies on the surface of the image sensor. The surface comprises an active sensor surface as well as a separate region for bonding pads, wherein the glass element preferably covers the entire active sensor surface. In this refinement, the imaging characteristics can be particularly precisely determined, because the optically effective gap between the aperture stop and the image sensor is filled with a single medium that can be precisely manufactured and the optical properties of which are defined. Moreover, the refinement enables a particularly robust design, wherein in particular the active sensor surface of the image sensor is protected against damage.

In a further refinement, the objective of the camera unit comprises at least one spherical lens with positive refractive power that defines a focal plane, wherein the aperture stop is disposed in the focal plane.

This refinement enables a particularly advantageous imaging characteristic of the camera unit. As a result of the particular position of the aperture stop, the objective collects from the object to be imaged only beams of which the barycentric ray runs parallel to the primary optomechanical axis. The incident rays fall on the entry pupil, which thus appears to be virtually placed at infinity. Particularly advantageously in the refinement, the image size remains almost unchanged during the displacement of an object, provided that the object to be inspected is located within the predetermined region, which is often referred to as the depth of focus. In particular for measurement applications, such a refinement is advantageous because no change of magnification occurs as a result of an objective displacement, perspective errors are compensated and object edges can thus be reliably localized.

It is understood that the aforementioned features and the features yet to be described can be used not only in the respective specified combination, but also in other combinations or on their own without departing from the context of the present invention.

BRIEF DESCRIPTION OF THE DRAWINGS

Exemplary embodiments of the invention are illustrated in the figures and are described in detail in the following description. In the figures:

FIG. 7 shows a further preferred exemplary embodiment of a sensor assembly of the new camera unit.

DESCRIPTION OF PREFERRED EMBODIMENTS

Figure 1:
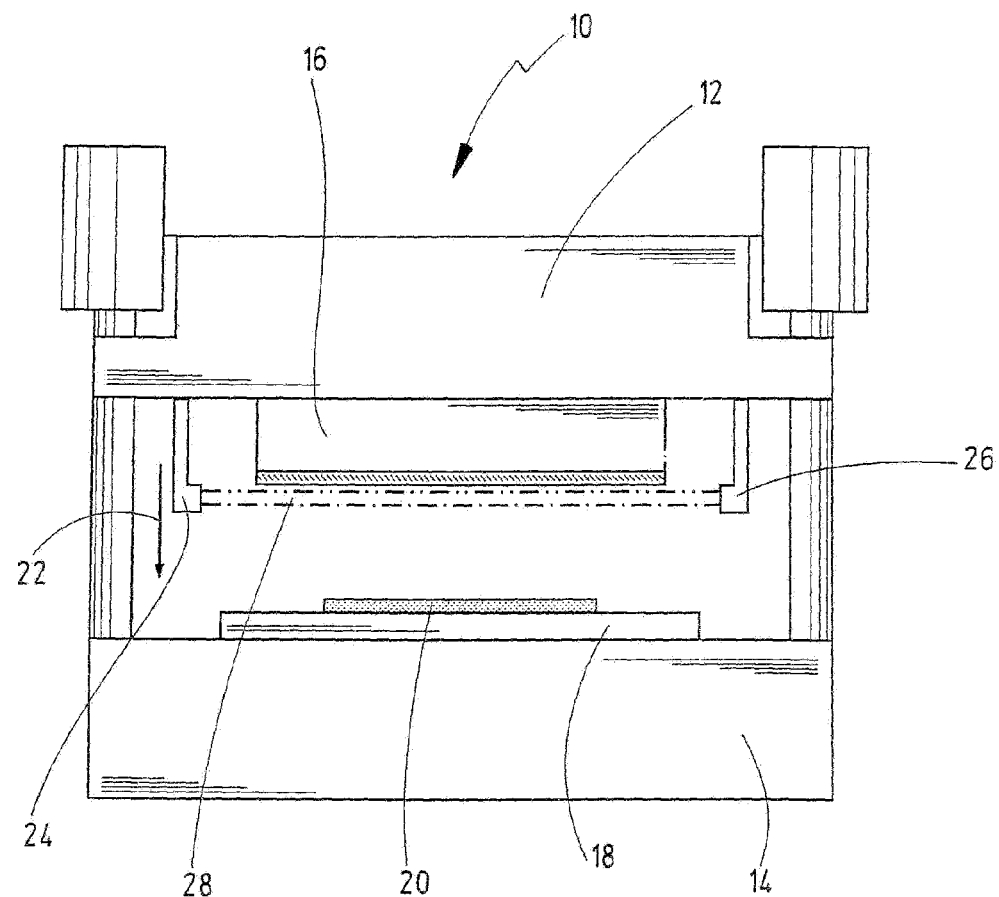
FIG. 1 shows a simplified representation of a bending press with a protective device including a camera unit according to a preferred exemplary embodiment of the invention.
Figure 1:
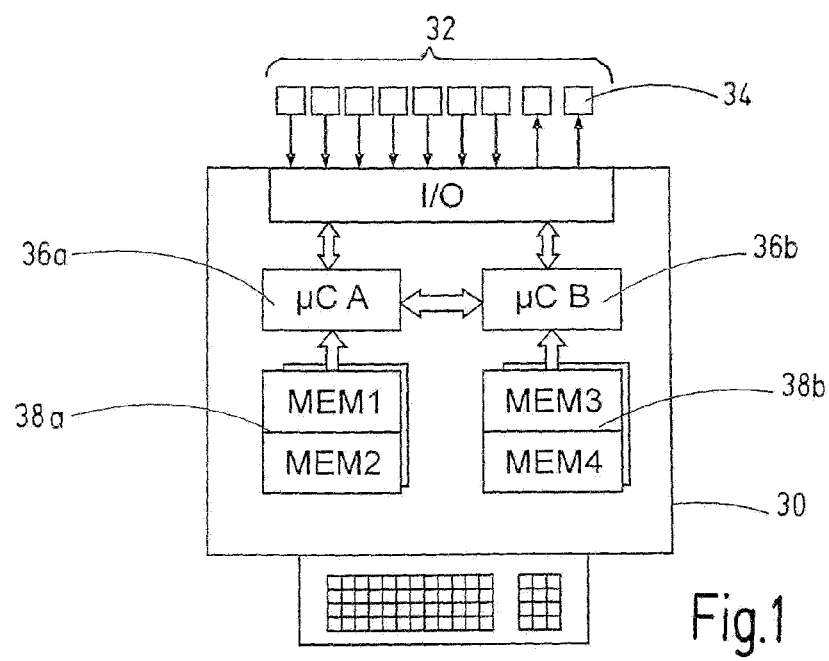

In FIG. 1 a bending press with a protective device, in which a camera unit according to a preferred exemplary embodiment of the invention is used as an image generating sensor, is designated in total by reference number 10. The bending press comprises a first machine part 12 and a second machine part 14 that are capable of performing a working movement relative to each other. Typically, the lower machine part 14 is stationary, whereas the upper machine part 12 is vertically moveable. In principle, however, the lower machine part 14 can also be moveable.

Moreover, the present invention is not limited to camera units for safeguarding bending presses. Although it is a preferred application area, the new camera unit can also be used as an image generating sensor for other applications, with which the hazardous working region of an automated working machine or system is to be safeguarded using an image generating sensor. Moreover, the new camera unit can in principle also be used for other purposes, such as for monitoring a spatial region in the context of an access control, or as an image generating sensor in automated systems and processes for quality assurance.

In the present exemplary embodiment, the bending press 10 comprises a pressing tool 16 (punch) that is attached to the upper machine part 12. A die 18 on which a workpiece 20 rests is disposed on the lower machine part 14. The pressing tool 16 can be moved downwards in the direction of arrow 22 and plunged into the die 18 in order to deform the workpiece 20.

A light source is denoted by reference number 24. A camera unit according to a preferred exemplary embodiment of the invention is denoted by the reference number 26. The light source 24 and the camera unit 26 are attached to the upper machine part 12 to the side of the pressing tool 16, so that they follow the working movement of the upper machine part 12. The light source 24 produces a light beam 28 that runs parallel to the leading edge of the pressing tool 16 and illuminates the camera unit 26 so that an image sensor disposed in the camera unit 26 can receive the light beam 28 if it is not interrupted or covered by an obstacle protruding into the working region of the pressing tool 16. The light source 24 and the camera unit 26 thus form an optical sensor that monitors the spatial region located in front of the leading edge of the pressing tool 16. As an alternative to a concurrently moving camera unit 26, the camera unit 26 can also be disposed on the stationary lower part of the machine and the pressing tool enters the protective space from above. A control unit comprising a plurality of connectors 32 is denoted by reference number 30. The control unit 30 is connected by means of the connectors 32 to sensors and actuators of the bending press 10. In particular, the control unit 30 is capable of outputting a stop signal by means of one or a plurality of output connectors 34 and the working movement 22 of the bending press 10 is stopped using the stop signal. Alternatively, the control unit 30 can also output a brake signal, by means of which the bending press 10 is braked to a safe speed. The control unit 30 produces the stop or brake signal inter alia if it receives a control signal from the camera unit 26 that signals an intrusion into the monitored spatial region.

The control unit 30 may also control the operating process of the bending press 10. Alternatively, the control unit 30 can be a separate safety controller that is only responsible for monitoring the safety functions and in particular for the timely shutdown of the working movement in the event of a hazardous situation. In the latter case it is advantageous if the control unit 30 is wholly or partly integrated within the camera unit 26. As shown in FIG. 1, the control unit 30 can however also be disposed separately from the camera unit 26.

The control unit 30 comprises a first and a second processor 36a, 36b here and a first and a second memory 38a, 38b. The processors 36a, 36b and memories 38a, 38b symbolize redundant signal processing channels within the control unit 30, which is a known implementation for safety controllers for controlling safety functions. Advantageously, the multi-channel-redundant design is also maintained if the control unit 30 is wholly or partly integrated within the camera unit 26. In preferred exemplary embodiments, the camera unit 26 is implemented as fail-safe to the extent that it fulfills at least the requirements of Safety Requirement Level SIL3 according to the Standard EN 61508 or comprises a Performance Level d according to the Standard EN ISO 13849-1.

Figure 2:
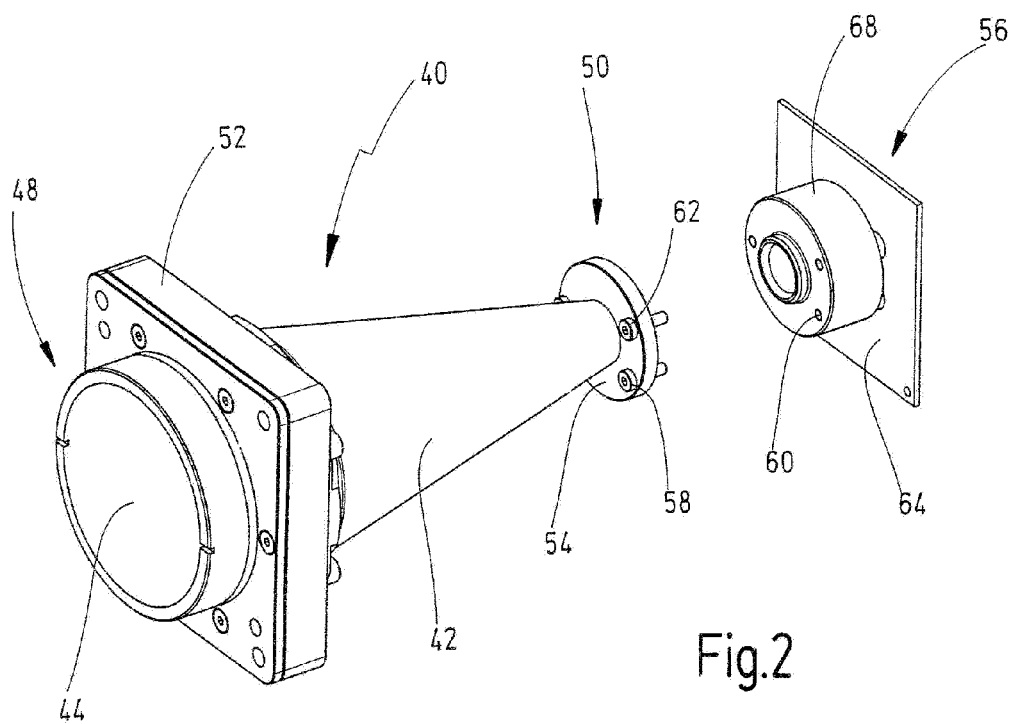
FIG. 2 shows a perspective representation of a preferred exemplary embodiment of the new camera unit in a disassembled state.
Figure 3:
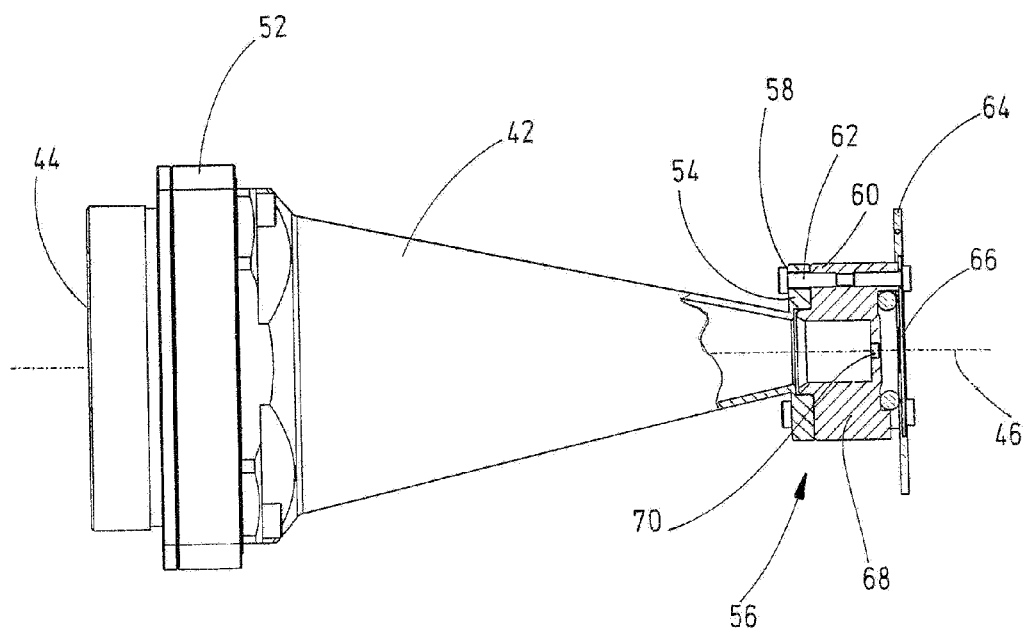
FIG. 3 shows a cross-sectional representation of the preferred exemplary embodiment of the new camera unit according to FIG. 2 in an assembled state.

With reference to FIGS. 2 and 3, a preferred mechanical design for the camera unit 26 is described in the following. Same reference numbers denote identical elements.

The camera unit 26 comprises an objective 40 with an objective body 42, in which a lens element 44 is located here. In general, the objective 40 may comprise a plurality of lens elements (not shown here). Moreover, the objective 40 may generally contain further optical elements, such as for example mirrors or lens and mirror combinations. The optical axis of the objective 40 is indicated in FIG. 3 by reference number 46.

The objective body 42 is of conical form here. The clear internal diameter thereof narrows from the front end 48 to the rear end 50. In the exemplary embodiment, the objective body 42 is enclosed by a mounting 52 at the front end 48. The objective can be fixed within a camera housing (not shown here) by means of the mounting 52.

In the exemplary embodiment, a mounting flange 54 by means of which a sensor assembly 56 can be coupled to the objective body 42 is disposed at the rear end 50 of the objective body 42. Bores 58 are provided in the mounting flange 54 as well as matching bores 60 in the sensor assembly 56 for the attachment of the objective body 42 with the sensor assembly 56. The bores 60 in the sensor assembly 56 each comprise an internal thread here. The sensor assembly 56 is reversibly joined to the objective body 42 by means of bolts 62 that are in contact with the mounting flange 54 and that engage the borehole 58 in the bores 60 in the sensor assembly 56.

In FIG. 2 the sensor assembly 56 is shown released from the objective body 42, whereas FIG. 3 shows the sensor assembly 56 and the objective body 42 in an assembled state. It is understood that the coupling only constitutes one possibility for connecting the objective body 42 to the sensor assembly 56. Alternatively, for example a plug connection would also be conceivable.

The multi-part sensor assembly 56 essentially contains a component support 64 on which an image sensor 66 is arranged and a coupling part 68 that joins the component support 64 to the objective body 22. An integrated aperture stop 70 that is fixedly joined to the coupling part constitutes an essential component of the optical system of the camera unit.

In a preferred exemplary embodiment, the optical system comprises a convergent lens as the lens element 44, i.e. a spherical lens with positive refractive power that converges the parallel incident light in a focal plane. Moreover, the objective body 42 and the coupling part 68 are designed so that in the assembled state the aperture stop 70 comes to lie in the focal plane at the focal point of the convergent lens. In this way the objective 40 only collects beams from an object to be imaged running parallel to the optomechanical axis 46. In other words, only rays from an object with an almost axis-parallel beam path are imaged on the image sensor 66.

For use as part of a protective device, as described in FIG. 1, such an embodiment of the optical system is particularly advantageous, because only the light rays 28 from the light source 24 that run parallel to the leading edge of the pressing tool 16 are imaged on the image sensor 66. The protective device is thus particularly resistant to interference by scattered light that is incident on the camera unit. Likewise, perspective effects that cause a change of the magnification in normal objectives can be avoided by the preferred arrangement of the optical system, in particular the aperture stop 70.

Figure 4:
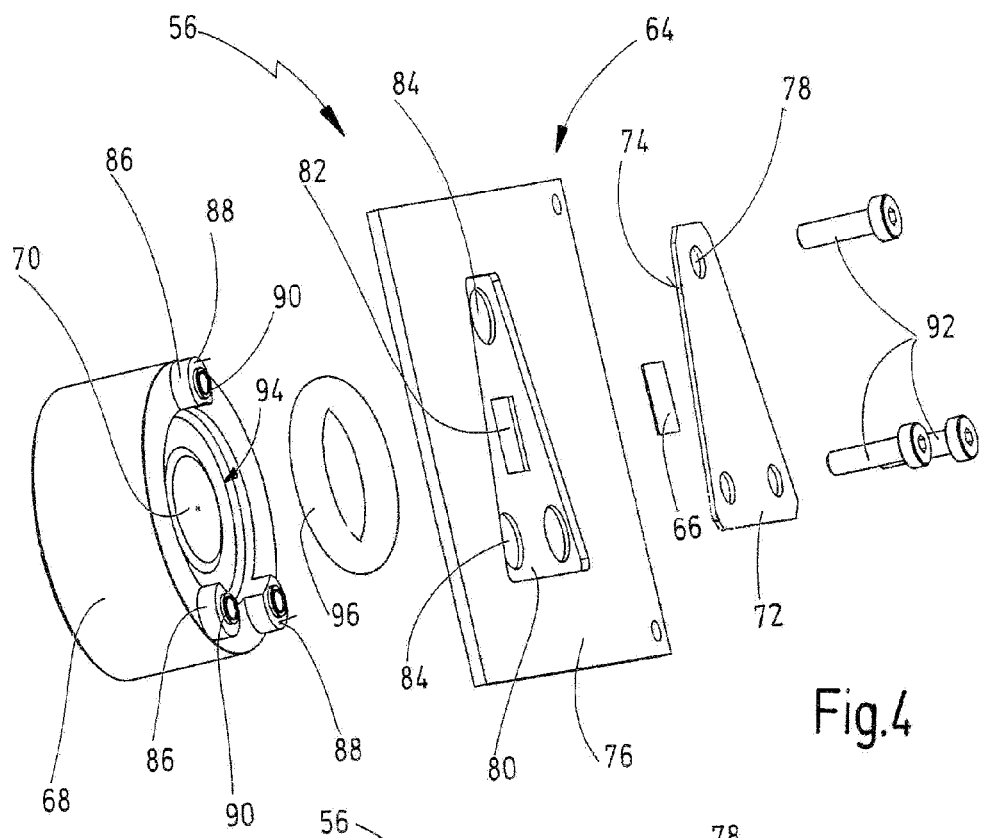
FIG. 4 shows an exploded representation of a preferred exemplary embodiment of a sensor assembly of the new camera unit.
Figure 5:
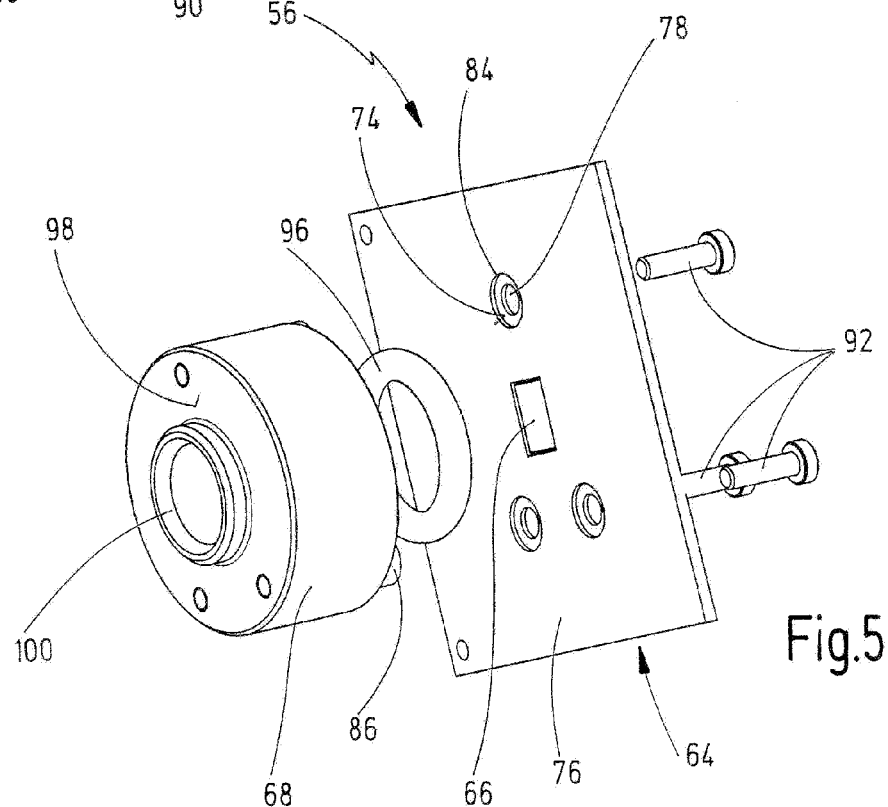
FIG. 5 shows a further exploded representation of a preferred exemplary embodiment of a sensor assembly of the new camera unit from a further perspective.

A preferred design of the sensor assembly 56 is described with reference to FIGS. 4 and 5, each of which shows an exploded representation of the sensor assembly 56 from different perspectives. Here too the same reference numbers each denote identical elements.

In the preferred exemplary embodiment, the component support 64 is formed of two components. The first component is an insulator, preferably a ceramic substrate 72, which has high strength and a very flat surface 74. The flat surface 74 can for example be produced by a suitable grinding process. Alternatively, a different electrically insulating material could be used. The second component of the component support 64 is a printed circuit board 76 on which electronic components (not shown here) for activating and for reading out from the image sensor 66 are disposed. The image sensor 66 is disposed on the insulator and generally glued to the same. The image sensor 66 is preferably connected to the circuit board 76 by means of bonded wires.

Moreover, the processors 36A, 36B and the memories 38A, 38B of the controller 30 could also be wholly or partly disposed on the circuit board 76. Alternatively or in addition to this, the components could also be disposed on a further component support (not shown here) that is connected to the circuit board 76 by means of plug connectors.

In the preferred exemplary embodiment, the circuit board 76 and the ceramic substrate 72 are glued together. For this purpose the circuit board 76 comprises a recess 80 in which the ceramic substrate 72 can be placed. The surface 74 of the ceramic substrate 72 on which the image sensor 66 is disposed is preferably glued to the circuit board 76, wherein a through opening 82 in the circuit board 76 is provided in which the image sensor 66 is disposed. The through opening 82 is cut out generously, so that a free space remains between the image sensor 66 and the circuit board 76. The free space functions as an electrical isolation between the two parts, so that the image sensor 66 can preferably be glued directly onto the ceramic substrate 72 without a sensor housing or a chip housing.

The ceramic substrate 72 also comprises three bores 78 that are disposed so that they span a triangular area, with the image sensor 66 being disposed within the triangular area. The bores 78 are used to join and accurately orient the ceramic substrate 72, the circuit board 76 and the coupling part 68. Cut outs 84 in the form of through openings in the circuit board 76 coaxial to the bores 78 are provided for this purpose and the coupling part 68 can access the ceramic substrate 72 through the cut outs 84.

The coupling part 68 comprises a cylindrical body in this preferred exemplary embodiment. Three receiving journals 86 are disposed on the end face of the body facing the component support 64. The receiving journals 86 are preferably made in one piece with the body of the coupling part 68 and each comprise a supporting surface 88, in the center of which a conical locating pin 90 is disposed. Each receiving journal 86 also comprises an axial threaded bore here, into which one of the bolts 92 can be screwed.

In the assembled state the receiving journals 86 extend through the cut outs 84, so that the locating pins can engage in the bores 78 in the ceramic substrate 72. The supporting surfaces 88 of the receiving journals 86, which lie in a common plane, thus come to lie flush on the surface 74 of the ceramic substrate 72. In other words, all of the supporting surfaces 88 lie in a plane that is identical in the assembled state with the plane defining the surface 74 of the ceramic substrate 72. The locating pins 90 enable accurate positioning of the ceramic substrate 72 here. Overall, the supporting surfaces 88 and locating pins 90 thus ensure that the coupling part 68 is oriented very accurately and in a very stable manner to the component support 64, in particular to the ceramic substrate 72 and the image sensor 66.

Furthermore, the receiving journals 86 are designed such that their height exceeds the width of the circuit board 76, preferably by at least three times. Moreover, the through opening 82 and the cut outs 84 in the circuit board 76 are cut out generously so that the coupling part 68 is essentially only joined to the ceramic substrate 72. At least at the end the cylindrical coupling part 68 is only joined to the ceramic substrate 72.

In a preferred exemplary embodiment, the aperture stop 70 integrated within the coupling part 68 is disposed in a depression 94 that is enclosed by an O-ring 96 as a seal. The O-ring 96 encircles the edge of the depression 94 and is clamped between the coupling part 68 and the circuit board 76 during assembly, so that a cavity in which the image sensor 66 is disposed is formed by the depression 94 and the surface of the circuit board 76. The image sensor 66 is thus enclosed dust tight and is particularly well protected against fouling, in particular if the image sensor 66 is disposed on the ceramic substrate 72 without a sensor housing.

For connecting the objective body 42 to the coupling part in this exemplary embodiment, a mounting surface 98 on which the objective body 42 can be laid flush is formed on the side of the coupling part 68 facing away from the component support 64. By means of an adapter ring 100 the objective body 42 is centered relative to the coupling part 68 and the aperture stop 70 contained therein. The objective body 42 is, as already described, preferably bolted to the coupling part 68. Alternatively, the objective body 42 may be designed such that it can be inserted into an opening in the coupling part 68.

The preferred embodiment of the aperture stop and the preferred dimension of the coupling part 68 are described in detail below with reference to FIG. 6.

Figure 6:
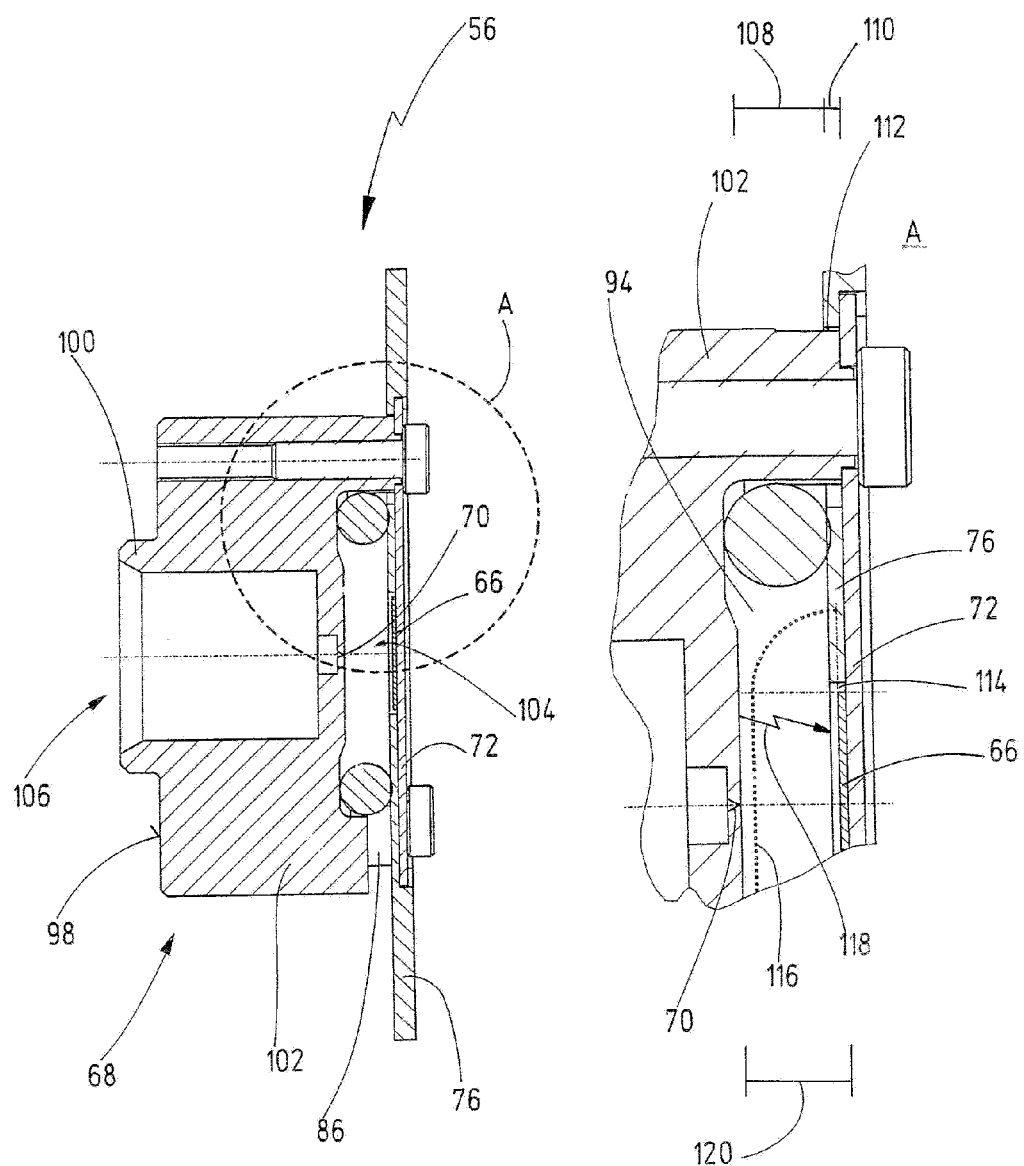
FIG. 6 shows a cross-sectional representation of the sensor assembly according to the exemplary embodiment according to FIG. 4 or 5 including an enlarged representation of a relevant segment.

FIG. 6 shows the previous exemplary embodiment of the sensor assembly 56 in a cross-sectional representation including an enlargement (A) of the relevant parts. Same reference numbers again denote identical parts here too.

With reference to the cross-sectional representation, in particular the dimensions of the sensor assembly 56 are shown. In the preferred exemplary embodiment, the coupling part 68 comprises a cylindrical body 102 with a first and a second circular opening 104, 106 in the two end faces. The first and the second openings 104, 106 are essentially cylindrical cut outs in the cylindrical body 102 of the coupling part 68, being joined by means of a point-shaped through opening performing the function of the aperture stop 70.

In the end surface facing the component support 64, the internal diameter of the first opening 104 is large in relation to the depth of the opening 104, so that a flat depression 94 with a narrow annular edge is formed in the end surface of the coupling part 68. The receiving journals 86 described above are disposed on the edge of the depression and form the support for the component support 64. The aperture stop 70 is disposed at the bottom of the depression and forms the through opening between the first and the second openings 104, 106 in the coupling part 68. The preferably point-shaped aperture stop 70 connects the two openings 104, 106 and is preferably produced in the coupling part 68 in a late production step by means of a laser. Alternatively, the aperture stop may be etched by means of a photochemical process for example.

In the exemplary embodiment, the second opening 106 in the end face facing away from the component support comprises a relatively narrow internal diameter, so that a wider edge with a very large supporting surface 98 for the objective body 42 is formed on the end. The second opening 106 can, as shown here, be enclosed by an annular bead 100, by means of which the objective body 42 can be oriented in relation to the second opening 106. Alternatively, an objective body 42 can also be designed such that it can be inserted into the second opening 106.

A depth of the depression 94 in the coupling part 68 is denoted by reference number 108 in the enlarged segment and the height of the receiving journals 86 measured from the edge of the depression to the supporting surface 88 is denoted by reference number 110. Together the two variables 108, 110 define the distance from the aperture stop 70 to the surface of the ceramic substrate 72 on which the image sensor 66 is disposed. It can also be seen from FIG. 6 that a free space 112 remains between the circuit board 76 and the image sensor 66 and a further free space 114 remains between the circuit board 76 and the coupling part 68. Orientation of the image sensor 66 is thus carried out exclusively by means of the arrangement of the coupling part 68 relative to the ceramic substrate 72. In this way particularly accurate orientation can be carried out because the ceramic substrate 72 is of a harder form than the circuit board 76 and is essentially independent of temperature fluctuations. The coupling part 68 and the ceramic substrate 72 thus form a particularly rigid structure.

A safety margin that is formed around the image sensor 66 and that is free of electrical charges in relation to the image sensor 66 is indicated here by reference number 116. The safety margin 116 thus marks an electrical isolation region that is used to prevent a voltage breakdown on the image sensor 66, a voltage breakdown being indicated here by the arrow 118. In particular, the coupling part 68, which is joined to the objective body 42, which in turn is joined to the housing of the camera unit 26, should be disposed at a defined safety distance 120 from the image sensor 66 because it cannot be excluded that the parts will become statically charged. The depth of the depression 108 and the height of the receiving journals 110 are therefore selected so that the distance does not become less than a defined safety distance 120. In the preferred embodiment, the image sensor 66 is thus particularly well insulated and protected against voltage breakdowns 118 from the coupling part 68 to the image sensor 66.

A further exemplary embodiment for a sensor assembly 56 is shown with reference to FIG. 7. The component support 64 comprises a one-piece circuit board 122 here, on which the image sensor 66 is disposed. The exemplary embodiment thus does not involve a two-part implementation of the component support 64. The component support 64 is joined to the objective body 42 by means of an insulating coupling part 124. In contrast to the previous exemplary embodiment, here the coupling part 124 itself is thus in the form of an electrical insulator in order to electrically isolate the image sensor 66 from the objective body 42.

A clamping mechanism containing a clamping ring 126 and attachment bolts 128 is provided for attaching the insulating coupling part 124 to the objective body 42. The insulating coupling part 124 further comprises a radially outward facing mounting flange, which is clamped and fixed between the clamping ring 126 and the objective body 42. The circuit board 122 is fixed to the coupling part 124 by means of a second clamping mechanism with a journal 132 and an attachment element 130. In the present exemplary embodiment, for this purpose the attachment element 130 is inserted through the circuit board 122 into a bore in the coupling part 124 and is fixed by means of the journal 132 that runs perpendicular thereto. Moreover, the circuit board 122 can be oriented by means of a centering pin 134 that is pushed through an opening in the circuit board 122 into a corresponding opening in the coupling part 124.

Moreover, in the exemplary embodiment the sensor assembly 56 comprises a glass element 136 that can be inserted into the coupling part 124 with a precise fit, so that there is a form fit between the glass element 136 and the coupling part 124. A thin, lightproof coating 138 is applied to a surface of the glass element 136, for example by deposition. Furthermore, a hole 140 is made in the lightproof coating 138 by means of a laser and performs the function of an aperture stop for the optical system and is disposed coaxially with a larger opening 70 of the coupling part 124. The opening 70 of the coupling part 124 is a cut out in the coupling part 124 here with no optical function.

Moreover, the glass element 136 is designed such that, at least in some segments, it rests flat and flush on the image sensor 66. In particular, the glass element 136 rests on an active surface of the image sensor, wherein bonding pads, which are also disposed laterally on the surface of the image sensor, are kept free. In other exemplary embodiments, the image sensor 66 can be a back-thinned image sensor, in which the entire surface of the glass element 136 can be glued to the top of the image sensor, because no bonded connections rest on the surface with such a sensor. The region around the image sensor 66 is enclosed in a dust-tight manner by means of O-rings 142. Also in the exemplary embodiment, the aperture stop 140 is fixedly and non-adjustably oriented to the image sensor 66, because the glass element 136 is fixedly joined to the circuit board 122. Moreover, the image sensor 66 is particularly well protected against voltage breakdowns by the insulating coupling part 124.

It will be understood that the aforementioned versions only constitute two possible exemplary embodiments of the new invention and there are numerous possible versions. For example, a coupling part could be made entirely of glass and thus the aforementioned features of the insulation and the special aperture design could be combined in one element. Moreover, other clamping mechanisms than the aforementioned one can be used for joining the individual components. The precise orientation of the aperture stop in relation to the image sensor by means of a one-piece coupling element and sufficient insulation between the image sensor and the coupling element are essential.

What is claimed is:

1. An apparatus for safeguarding a machine having a first machine part and a second machine part, wherein the first machine part performs a working movement relative to the second machine part in order to process a workpiece, the apparatus comprising:
    a light source, a camera unit, and a control unit,
    wherein the camera unit is configured to be attached to the first machine part in such a manner that it concurrently moves together with the first machine part during the working movement and views into a spatial region in front of the first machine part,
    wherein the light source is configured to be arranged opposite the camera unit so that it illuminates the camera unit along the spatial region during the working movement,
    wherein the control unit is designed to stop the working movement of the first machine part depending on a signal produced by the camera unit, and
    wherein the camera unit comprises—
    an objective body in which at least one optical lens element is secured,
    an electronic image sensor arranged on a component support,
    a coupling part having a one-piece body by means of which the objective body and the component support are joined in a defined relative position to one another, thereby forming an integrated camera assembly, and
    an aperture stop,
    wherein the component support has a surface on which the electronic image sensor is arranged,
    wherein the one-piece body fixedly rests on the surface thereby holding the aperture stop at a defined position relative to the electronic image sensor without individual adjustment, and
    wherein the one-piece body has a pot-like depression defining inner side walls and a bottom, with the aperture stop being formed by a hole in said bottom.

2. The apparatus of claim 1, wherein the aperture stop is integrally formed in the one-piece body.

3. The apparatus of claim 1, wherein the aperture stop is centrally arranged with respect to the one-piece body.

4. The apparatus of claim 1, wherein the component support comprises a ceramic substrate forming the surface on which the image sensor is fixedly arranged.

5. The apparatus of claim 1, wherein the one-piece body comprises a first and a second locating pin and the plane surface of the component support comprises a first and a second opening, wherein the first locating pin engages in the first opening and the second locating pin engages in the second opening.

6. The apparatus of claim 1, wherein the image sensor is arranged directly on the component support without a sensor housing.

7. The apparatus of claim 1, wherein the camera unit further comprises a seal, which together with the one-piece body and the component support encloses the image sensor in a dust tight manner.

8. The apparatus of claim 1, wherein the at least one optical lens element defines a focal plane, and wherein the aperture stop is arranged in the focal plane.

9. The apparatus of claim 1, wherein the at least one optical lens element comprises at least one spherical lens with positive refractive power.

10. A camera unit for an apparatus for safeguarding or controlling a machine, comprising:
    an objective body in which at least one optical lens element is secured,
    an electronic image sensor arranged on a component support,
    a coupling part having a one-piece body by means of which the objective body and the component support are joined in a defined relative position to one another, thereby forming an integrated assembly, and
    an aperture stop,
    wherein the component support has a surface on which the electronic image sensor is arranged,
    wherein the one-piece body fixedly rests on the component support thereby holding the aperture stop at a defined position relative to the electronic image sensor without individual adjustment, and
    wherein the one-piece body has a pot-like depression defining inner side walls and a bottom, with the aperture stop being formed by a hole in said bottom.

11. The camera unit of claim 10, wherein the aperture stop is integrally formed in the one-piece body.

* * * * *